United States Patent [19]

Giroux

[11] Patent Number: 5,539,057
[45] Date of Patent: Jul. 23, 1996

[54] PROCESS FOR SEQUENTIALLY GRAFTING OLEFIN POLYMER MATERIALS AND GRAFTED POLYMERS THEREFROM

[75] Inventor: Thomas A. Giroux, Bear, Del.

[73] Assignee: Montell North America Inc., Wilmington, Del.

[21] Appl. No.: 469,733

[22] Filed: Jun. 6, 1995

Related U.S. Application Data

[63] Continuation of Ser. No. 189,349, Jan. 31, 1994, abandoned.

[51] Int. Cl.⁶ .................................. C08F 285/00
[52] U.S. Cl. ..................... 525/309; 525/263; 525/301
[58] Field of Search ......................... 525/263, 309, 525/301

[56] References Cited

U.S. PATENT DOCUMENTS

| | | |
|---|---|---|
| 3,240,843 | 3/1966 | Nelson . |
| 3,668,274 | 6/1972 | Owens et al. . |
| 4,595,726 | 6/1986 | Klosiewicz . |
| 4,857,600 | 8/1989 | Gross et al. . |
| 4,888,394 | 12/1989 | Boudreaux, Jr. . |
| 5,140,074 | 8/1992 | DeNicola et al. . |
| 5,247,040 | 9/1993 | Amick et al. . |
| 5,310,794 | 5/1994 | DeNicola, Jr. et al. ............ 525/71 |

FOREIGN PATENT DOCUMENTS

| | | |
|---|---|---|
| 0522233 | 2/1992 | European Pat. Off. . |
| 0563632 | 9/1993 | European Pat. Off. . |

*Primary Examiner*—Vasu S. Jagannathan

[57] ABSTRACT

Disclosed is a process for sequentially grafting olefin polymer materials with vinyl monomers and the graft polymers produced therefrom.

14 Claims, 6 Drawing Sheets

PROCESS FOR SEQUENTIALLY GRAFTING OLEFIN POLYMER MATERIALS AND GRAFTED POLYMERS THEREFROM

This application is a continuation of application Ser. No. 08/189,349, filed Jan. 31, 1994 abandoned.

FIELD OF INVENTION

This invention relates to a process for grafting olefin polymer materials. In particular, this invention relates to a process of sequentially grafting olefin polymer materials.

BACKGROUND OF THE INVENTION

Graft copolymers of polypropylene have been of interest for some time because they are capable of possessing some properties of the grafted polymer (produced by the homo- or copolymerization of the monomer or monomers, respectively) as well as of the olefin polymer backbone. It has been suggested, for example, that certain of these graft copolymers be used as compatibilizers for normally immiscible polymer systems.

The preparation of graft copolymers by creating active sites on the main polymer chain or backbone, and initiating graft polymerization of a polymerizable monomer at these sites, is well-known. Procedures which have been used for introducing such active sites into the polymer chain have included treatment with organic chemical compounds capable of generating free radicals, and irradiation. In the chemical method, an organic chemical compound capable of generating free radicals, such as a peroxide or azo compound, is decomposed in the presence of the backbone polymer with the formation of free radicals, which form the active grafting sites on the polymer and initiate the polymerization of the monomer at these sites.

Of the various techniques which have been employed for preparing graft copolymers of polyolefins by the chemical method of free radical generation, the bulk technique, in which the polymer particles are contacted directly with the initiator and monomer, without the intervention of a liquid suspending medium or a solvent, is advantageous in terms of simplicity of execution and the avoidance of side-reactions caused by the presence of certain solvents or suspending media, such as water. However, regardless of the physical state of the polymer to be grafted, the grafting process is subject to problems such as degradation of the polyolefin, possibly leading to a graft copolymer having an undesirably high melt flow rate, and excessive formation of the homopolymer of the grafting monomer at the expense of the formation of the polyolefin graft copolymer.

U.S. Pat. No. 4,595,726 discloses graft copolymers of 3–100%, preferably 3–30%, by weight of an alkyl methacrylate moiety grafted onto a polypropylene backbone. The graft copolymers, useful as adhesives in polypropylene laminates, are prepared at a temperature below the softening point of polypropylene by a solvent-free reaction, reportedly vapor-phase, between polypropylene and the methacrylate monomer in the presence of a free radical forming catalyst. A preferred initiator is tert-butyl perbenzoate, stated as having a 15-minute half-life at 135° C., and reactor temperatures of 135° C. and 140° C. are disclosed. Degradation of the polypropylene chain due to the reaction conditions employed is reported. Immediately after the peroxide is added to the polypropylene, the monomer is added over a time period which is fixed by the half-life of the peroxide initiator (i.e., 1–2 half-lives). In other words, according to the teachings of U.S. Pat. No. 4,595,726, for a given initiator half-life, it is necessary to employ a higher rate of addition of the monomer as the total amount of monomer to be added increases.

The preparation of "graft-type" copolymers by dissolving an organic peroxide in a monomer and adding the solution to free-flowing particles of the base polymer, particularly polyvinyl chloride, is described in U.S. Pat. No. 3,240,843. The "graft-type" products are described as having monomeric, as opposed to polymeric, branches attached to the polymer backbone. Homopolymerization of the monomer also is mentioned. To avoid particle agglomeration, the amount of monomer added cannot exceed the maximum absorbable by the polymer particles. In the case of polypropylene charged into a reactor with a solution containing styrene, butadiene, acrylonitrile, and benzoyl peroxide, the total amount of monomers added is only 9% of the amount of polypropylene charged.

U.S. Pat. No. 5,140,074 discloses a method of producing olefin polymer graft copolymers by contacting a particulate olefin polymer with a free radical polymerization initiator such as peroxide. According to this process the olefin polymer is grafted with at least one or more monomer in only one stage. When two or more monomers are grafted they are copolymerized onto the polymer backbone forming a copolymer instead of two individual polymers.

SUMMARY OF THE INVENTION

The present invention provides a method of sequentially grafting an olefin polymer material wherein free radical sites are produced in a particulate olefin polymer material by first treating the polymer material at a temperature of from about 60° C. to 125° C. with from about 0.1 to 6.0 pph (parts by weight per 100 parts by weight of the olefin polymer material) of an organic compound which is a free radical polymerization initiator and has a decomposition half-life of from about 1 to 240 minutes at the temperature employed.

Over a time period which coincides with, or follows, the period of initiator treatment, with or without overlap, the polymer material is treated with about from 5 to 145 pph of a grafting monomer which is capable of being polymerized by free radicals, the temperature employed during any period of monomer treatment being as indicated above with respect to initiator treatment. The addition of the grafting monomer to the polymer material is controlled so that at all addition levels from about 5 to 145 pph, the rate of addition does not exceed about 4.5, preferably does not exceed about 4.0, and most preferably does not exceed about 3.0 pph per minute.

After the first grafting period, i.e., the period of treatment with the grafting monomer, and any hold period at reaction conditions subsequent thereto, any unreacted monomer is removed from the resultant grafted particulate olefin polymer material, and the decomposition of any unreacted initiator and deactivation of any residual free radicals are promoted, e.g., by a temperature increase.

In the presence of the grafted olefin polymer produced according to the method of the first stage, the temperature of the reactor is adjusted to the desired polymerization temperature from 60° C. to 125° C., and the reactor is purged with nitrogen. Then the second grafting monomer and initiator addition wherein the grafted olefin polymer material is treated with about from 5 to 145 pph of a grafting monomer which is capable of being polymerized by free radical is begun. The monomer addition, reaction hold, and polymer drying are repeated in their entirety as in the first graft polymerization reaction. The total amount of grafted monomer does not exceed 150 pph. During the entire graft polymerization process in all stages the polymer material is maintained in a substantially non-oxidizing environment.

As used herein "sequentially grafting or grafted" defines a method by which an olefin polymer material backbone has been grafted with at least one monomer, is further grafted with at least one monomer.

BRIEF DESCRIPTION OF THE DRAWINGS

The grafted olefin copolymer product of this invention is illustrated by reference to the accompanying drawings in which.

DETAILED DESCRIPTION OF THE INVENTION

The method of this invention embodies a combination of steps which together permit olefin polymer graft copolymers to be obtained not only in high conversions (monomer consumption) but also with a high degree of graft efficiency. Moreover, degradation of the backbone olefin polymer material is minimized, thereby avoiding the production of a graft copolymer having a melt flow rate which is substantially higher than that of the starting backbone olefin polymer, a condition that can adversely affect the processing behavior of the graft copolymer.

In the present process, the monomer feed rate can be as low as desired, and the minimum generally will be dictated by the capability of available equipment and economic considerations. While rates of at least about 0.1 to 0.2 pph/min can be used, a preferred minimum is about 0.3 pph/min. Preferred rates in any particular case will depend on such factors as the monomer feed level, the initiator/monomer addition mode, and the reactivity of the particular monomer used.

The addition of monomer at a rate of from about 0.1 to 4.5 pph/min., preferably from 0.3 to 4.0 pph/min. results in high monomer conversions over a wide range of monomer feed levels. The monomer addition rates set forth above, including those above the preferred maximum, are suitable with lower monomer feed levels, e.g., levels up to about 40 pph. Also, the maximum monomer addition rate of about 4.0 pph/min is preferred provided that the monomer feed level does not exceed about 40 pph.

In one embodiment of the present invention, the time period during which the mass of olefin polymer particles is treated with the grafting monomer follows the time period during which the particle mass is treated with the initiator. In this case (separate-addition mode), the initiator is added first to the particles, which are preferably heated to the temperature being used, and the production of free radical sites in the olefin polymer material begins. The addition of the monomer may begin immediately after the addition of the initiator has been completed, or after delay or hold time subsequent to the completion of the initiator addition. Separate additions also can be multi-stage whereby the additions are incremental and the initiator/monomer addition sequence is repetitive. In another embodiment, the initiator and the monomer are added to the heated polymer particles at the same time (concurrent-addition mode), e.g., by combining the initiator (neat or a liquid solution thereof), and the monomer (neat or a liquid solution thereof) at a temperature at which no appreciable decomposition of the initiator occurs. The concurrent addition of separate initiator and monomer streams also can be employed, as well as a combination of separate addition and concurrent addition, in which the monomer addition period follows the initiator addition period overlap. Whether the initiator and monomer are added concurrently or monomer addition follows initiator addition, either the initiator or monomer, or both, can be added continuously or intermittently. The process of the invention can be carried out as a semi-batch, semi-continuous, or continuous process.

In the first stage of the instant process, the particulate olefin polymer material which is treated with the initiator and the grafting monomer is at a temperature of from about 60° C. to about 125° C., preferably from about 80° C. to 120° C. While temperatures below about 60° C. can be used, the decomposition half-life of many free radical initiators at such temperatures is so long as to be impractical, and initiators having short enough half-life below about 60° C. are often difficult to handle. Above 125° C., the sharp reduction in decomposition half-life which occurs with many initiators causes the monomer conversion to drop, particularly in the separate-addition mode. Moreover, initiators having longer half-lives at temperatures above 125° C. tend to have an adverse effect on the olefin polymer and/or the resulting graft copolymer.

Treating the olefin polymer material with the initiator and the monomer at a temperature as set forth above provides an initiator half-life of about from 1 to 240 minutes. After the addition of the monomer, the thus treated polymer material may be maintained at the selected temperature for at least about 3 minutes, preferably at least about 10 minutes. This hold period may be extended to several hours, especially at lower temperatures. Preferably the initiator and temperature will be selected to allow grafting to be completed in either stage within about 2 to 10 initiator half-lives.

To assure high conversion and graft efficiency, and effective use of the initiator, a time of at least 1 preferably at least 2, initiator half-lives at the selected temperature should elapse between the start of the initiator addition period and the end of the monomer removal step. The time from the start of monomer addition to the end of the grafting period depends on the amount of monomer used and the rate of addition, longer times being used at lower temperatures and high monomer feed levels. At the monomer addition rates used in the present process, the hold period, if any, after completion of the monomer addition generally is as stated above, longer hold periods after monomer addition preferably being used at lower temperatures and higher monomer feed levels. In the separate-addition mode, preferably no more than about 2.5 initiator half-lives should separate the initiator and monomer addition periods to assure availability of the necessary free radicals once the addition of the monomer begins.

The olefin polymer material useful in the practice of the sequential grafting process of this invention for preparing graft copolymers of olefin polymers is (a) a homopolymer of a linear of branched $C_{2-8}$ alpha-olefin; (b) a random copolymer of a linear of branched $C_{2-8}$ alpha-olefin with a different olefin selected from the group consisting of $C_2$–$C_{10}$ 1-olefins, provided that, when the random copolymer is of propylene and the different olefin is ethylene, the maximum polymerized ethylene content is about 10%, preferably about 4%, by weight; when the random copolymer is a propylene and the different olefin is a $C_4$–$C_{10}$ 1-olefin, the maximum polymerized content thereof is about 20%, preferably about 16%, by weight; and when the random copolymer is of propylene and the different olefins are ethylene and a $C_{4-10}$ alpha-olefin, the maximum polymerized content thereof is about 10%, and preferably about 5%, by weight; (c) a random terpolymer of linear or branched $C_{3-8}$ alpha-olefin and two different olefins selected from the group consisting of ethylene and $C_4$–$C_8$ 1-olefins, provided that the maximum polymerized $C_4$–$C_8$ 1-olefin content is about 20%, preferably about 16%, by weight, and, when ethylene is one of the olefins, the maximum polymerized ethylene content is about 5%, preferably about 4%, by weight; or (d) a homopolymer of (a) or random copolymer (b) of propylene which is impact-modified with an ethylene-propylene monomer rubber in the reactor or by physical blending, the ethylene-propylene monomer rubber content of the modified polymer being in the range of about from 5% to 30% by weight, and the ethylene content of the rubber being in the range of about from 7% to 70%, and preferably about from 10% to 40%, by weight.

The $C_2$–$C_{10}$ 1-olefins which can be used in the preparation of the olefin polymer materials as described above include for example, ethylene, propylene, 1-butene, 1-pentene, 3-methyl-1-butene, 4-methyl-1-pentene, 1-hexene, 3,4-dimethyl-1-butene, 1-heptene, 3-methyl-1-hexene, and the like.

When the olefin polymer is an ethylene homopolymer, it has a density of 0.91 g/cm³ or greater, and when the olefin polymer is an ethylene copolymer with a $C_{3-10}$ alpha-olefin, it has a density of 0.91 g/cm³ or greater. Suitable ethylene copolymers include ethylene/butene-1, ethylene/hexene-1, and ethylene/4-methyl-1-pentene. The ethylene copolymer can be a HDPE or a LDPE. Typically LLDPE and LDPE have densities of 0.91 g/cm³ or greater and HDPE have densities of 0.95 g/cm³ or greater.

Homopolymers, random copolymers, random terpolymers, and impact-modified homopolymers and copolymers of propylene are preferred olefins polymer materials for use in the process of the present invention, and are referred to herein, individually or collectively, as propylene polymer materials.

Suitable forms of the olefin polymer material used in the present process include powder, flake, granulate, spherical, cubic and the like. Spherical particulate forms are preferred. The pore volume fraction can be as low as about 0.4, but it is preferred that the grafting be effected on olefin polymer particles having a pore volume fraction of at least 0.07. Most preferably, the olefin polymer used in this invention will have a pore volume of at least about 0.12, and most preferably at least about 0.20, with more than 40%, preferably more than 50%, and most preferably more than 90%, of the pores having a diameter larger than 1 micron, a surface area of at least 0.1 m²/g, and a weight average diameter of about from 0.4 to 7 mm. In the preferred polymer, grafting takes place in the interior of the particulate material as well as on the external surface thereof, resulting in a substantially uniform distribution of the graft polymer throughout the olefin polymer particle.

According to the process of the invention, free radical or active sites are produced in the particulate olefin polymer material by treating the polymer material with an organic compound which is a free radical generating polymerization initiator and has a decomposition half-life at the temperature employed of about from 1 to 240, preferably from about 5 to 100, and most preferably from about 10 to 40 minutes. Organic peroxides, and especially those which generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide,1, 1-di-tert-butylperoxy-3,5,5-trimethylcyclohexane, 2,5-dimethyl-2,5-di-tert-butylperoxyhexane, and bis(alpha-tert-butylperoxyisopropylbenzene); peroxy esters, such as tert-butylperoxypivalate, tert-butyl perbenzoate, 2,5-dimethylhexyl-2,5-di(perbenzoate), tert-butyl di(perphthalate), tert-butylperoxy-2-ethyl hexanoate, and 1,1-dimethyl-3-hydroxybutylperoxy-2-ethyl hexanoate; and peroxy carbonates, such as di(2-ethylhexyl)peroxy dicarbonate, di(n-propyl)peroxy dicarbonate, and di(4-tert-butylcyclohexyl)peroxy dicarbonate. Azo compounds, such as azobisisobutyronitrile, also may be used. Two or more initiators having the same or different half-lives may be employed.

The initiator, if liquid at the decomposition temperature used, may be used neat or in solution. If a solid at the decomposition temperature used, it may be dissolved in a suitable liquid solvent. The concentration of the initiator in solution typically should be from about 5% to 98% by weight. Peroxide initiators are available in hydrocarbon solutions at a concentration of about 12.5 to 75% by weight. Whether neat or in solution, the active concentration of the initiator per se should be from about 0.1 to 6.0 pph, preferably from about 0.2 to 3.0 pph, to assure the generation of a sufficient number of free radical sites on and in the olefin polymer material.

The grafting monomers useful in accordance with this invention may be any monomeric vinyl compound capable of being polymerized by free radicals wherein the vinyl radical, $H_2C=CR-$, in which R is hydrogen of methyl, is attached to a straight or branched aliphatic chain or to a substituted or unsubstituted aromatic, heterocyclic of alicyclic ring in a mono- or polycyclic compound. Typical substitutents may be alkyl, hydroxyalkyl, aryl, and halo. The vinyl monomer will be a member of one of the following classes: (1) vinyl-substituted aromatic, heterocyclic or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylpyridine and ethylvinylpyridine; (2) vinyl esters of aromatic and saturated aliphatic carboxylic acids, including vinyl formate, vinyl acetate, vinyl chloracetate; and (3) unsaturated aliphatic nitriles and carboxylic acids and their derivatives, including acrylonitrile, methacrylonitrile, acrylamide, methacrylamide, acrylic acid, acrylate esters, such as the methyl, ethyl, hydroxyethyl, 2-ethylhexyl and butyl acrylate esters, methacrylic acid, ethacrylic acid and methacrylate esters such as the methyl, ethyl, butyl, benzyl, phenylethyl, phenoxyethyl, epoxypropyl and hydroxypropyl methacrylate esters, maleic anhydride, and N-phenyl maleimide.

The grafting monomer, if liquid at room temperature can be used neat or in combination with a solvent or diluent which is inert with respect to the particulate polymer material and is polymerizable by free radicals. If a solid at room temperature, the grafting monomer can be used in solution in a solvent therefor which is inert as set forth above. Mixtures of neat monomer, diluent monomer, and/or dissolved monomer can be used. In all cases, whether or not a solvent or diluent is present, the amount of grafting monomer given above, from about 5 to 240 parts by weight per 100 parts by weight of olefin polymer material, is based on the actual monomer content.

When a diluent for the monomer is used, less than about 70%, preferably less than 50%, and most preferably less than 25% by weight, based on the weight of the monomer and the diluent is used to avoid excessive drops in graft level. Use of solvent in excess of the amount required to dissolve the monomer should be avoided for the same reason.

Solvents or diluents used are those compounds which are inert as described above and which have a chain transfer constant of less than about $1 \times 10^{-3}$. Suitable solvents or diluents include ketones, such as acetone, alcohols, such as methanol; aromatic hydrocarbons such as benzene and xylene; and cycloaliphatic hydrocarbons, such as cyclohexane.

In the process of the invention the particulate olefin polymer material is maintained in a substantially non-oxidizing atmosphere, e.g., under inert gas, during such time that free radicals are present therein. The olefin polymer material is also maintained in such an atmosphere during the formation of the free radicals. The reason for this is that, upon exposure to an oxidizing atmosphere such as air, the free radicals are converted to peroxy radicals, which visbreak or degrade the polymer material thereby causing substantial reductions in molecular weight with concomitant increases in melt flow rate. Moreover, with essentially all monomers, the presence of large amounts of air during the treatment with monomer interferes with the graft polymerization per se. Therefore, the treatment of the polymer with the initiator and with the grafting monomer is carried out in a substantially non-oxidizing atmosphere, as are the subsequent steps of the process.

The expression "substantially non-oxidizing" when used herein to described the environment or atmosphere to which the olefin polymer material is exposed, means an environment in which the active-oxygen concentration, i.e., the concentration of oxygen in a form that will react with the free radicals in the polymer material, is less than 15%, preferably less than 5%, and most preferably less than 1%, by volume. The preferred concentration of active oxygen is 0.004% or lower by volume. Within these limits the non-oxidizing atmosphere can be any gas to mixture of gases, which is oxidatively inert toward the free radicals in the olefin polymer material, e.g., nitrogen, argon, helium and carbon dioxide.

After the olefin polymer material has been maintained in contact with the monomer for the selected period of time, the resulting graft copolymer, while still maintained in a substantially non-oxidizing environment, is treated, preferably by heating, so as to decompose any unreacted initiator, if any, and to deactivate substantially all of the residual free radicals therein. Generally, heating at a temperature of at least 110° C. for at least 5 minutes, preferably at least 120° C. for about 20 minutes.

In the presence of the grafted olefin polymer produced above in the first graft polymerization stage, the temperature of the reactor is adjusted to from 60° C.–125° C. and the reactor is purged with nitrogen. The second grafting monomer and initiator addition is begun. The monomer addition, reaction hold, and polymer drying are repeated in their entirety as in the first graft polymerization reaction.

Any unreacted grafting monomer is removed from the graft copolymer, either before or after any unreacted initiator has been decomposed and any residual free radicals have been deactivated, or at the same time as the latter step. If the removal is effected before or during the final decomposition and/or deactivation, a substantially non-oxidizing environment is maintained. Preferably, any unreacted grafting monomer is removed after any unreacted initiator has been decomposed and any residual free radicals have been deactivated, or during the decomposition/deactivation.

The following examples, presented for illustrative purposes, describe various embodiments of the process of the present invention. Unless otherwise indicated, all parts and percentages are by weight, and all initiator amounts are on an active basis.

The physical properties set forth in the Tables were measured by the following methods:

| | |
|---|---|
| Flexural Modulus | ASTM D-790 and D-618, Procedure A (0.5 in/min. crosshead speed and center section of a molded T-bar) |
| Notched Izod | ASTM D-256-87 |
| Melt Flow Rate (MFR) | ASTM D-1238, Condition L |
| Elongation to Break | ASTM D-638 |
| Elongation to Yield | ASTM D-638 |
| Weldline Strength | ASTM D-638, (weldline located in the center of the bar caused by a dual-gate molded T-Bar.) |
| Tensile Strength | ASTM D-638 |

EXAMPLE 1

Five hundred grams of a 7025 XOS porous propylene homopolymer in the form of spherical particles having a MFR of 9 dg/min, commercially available from HIMONT Italia S.r.l., are placed in a 2-liter glass reactor equipped with a heating jacket and a helical impeller.

The reactor is purged with nitrogen at room temperature for approximately 15 minutes (to an active oxygen content of less than 0.004% by volume) and then heated to 100° C. by circulating hot oil through the reactor jacket, and equilibrated to that temperature while nitrogen purging and stirring at 180–200 rpm continued. Thereafter, purging is stopped, the reactor pressure is adjusted to atmospheric pressure, and a mixture of 5.62 g of an oxygen-free mineral spirit solution of LUPERSOL PMS tert-butylperoxy-2-ethylhexanoate containing 0.56 pph of the peroxy ester and 150 g of styrene, which had been purged with nitrogen at 5°–10° C., is sprayed into the reactor at a rate of 1.00 pph (parts per 100 parts polypropylene, by weight) per minute. The total addition time is 30 minutes. The reactor is maintained at 100° C. and stirring continued for 30 minutes after all of the styrene had been added.

At the end of the first grafting stage, the reactor is purged with nitrogen, and the reactor contents then are heated to 120° C. by purging with heated nitrogen. The reactor temperature is maintained at 120° C. for 30 minutes during which time any unreacted styrene monomer is swept out of the reactor in the nitrogen flow. Analysis of this product, polypropylene-g-polystyrene copolymer, indicated that 87% of the styrene had been converted to polystyrene, and the MFR of the graft copolymer was 5.8 dg/min.

The reactor containing 550 g of the graft copolymer prepared above was purged with nitrogen at room temperature (to an active oxygen content of less than 0.004% by volume) and then heated to 80° C. by circulating hot oil through the reactor jacket, and equilibrated to that temperature while nitrogen purging and stirring continued. Purging is discontinued, the reactor pressure is adjusted, and 1.39 g of an oxygen-free mineral spirit solution of LUPERSOL 11 tert-butylperoxypivalate containing 0.28 pph of the peroxy ester is sprayed onto the hot polymer. 148.4 g of butyl acrylate (BA), which had been purged with nitrogen at 5°–10° C., is sprayed into the reactor at a rate of 1.00 pph (parts per 100 parts polypropylene, by weight) per minute. The total addition time is 35 minutes.

At the end of the second graft polymerization stage, the reactor is purged with nitrogen, and the reactor contents then are heated to 120° C. by purging with heated nitrogen. The reactor temperature is maintained at 120° C. for 30 minutes during which time any unreacted butyl acrylate monomer is swept out of the reactor in the nitrogen flow. After cooldown under a nitrogen blanket, the free-flowing solid product, (polypropylene-g-polystyrene)-g-polybutyl acrylate copolymer, remaining in the reactor is discharged therefrom, dried and weighed.

The relative operative conditions for the preparation of and physical properties of the particulate graft copolymers of the present invention are shown below in Table 1A and 1B.

EXAMPLE 2

The procedure and ingredients of Example 1 are used with the exception that in the first graft polymerization stage the amount of propylene homopolymer used is 450 g, the amount of the peroxy compound used is 9.09 g, the amount of styrene used is 243 g, the styrene feed rate is 1.00 pph/min, the conversion was 94% and the MFR 2.5 dg/min., and in the second graft polymerization stage 130.5 g of butyl acrylate was used and 1.39 g of Lupersol 11 tert-butylperoxypivalate. Obtained was (polypropylene-g-polystyrene)-g-polybutyl acrylate graft copolymer.

The relative operative conditions for the preparation of and physical properties of the particulate graft copolymers of the present invention are shown below in Table 1A and 1B.

TABLE 1A

| Polymerization | Ex. 1 | Ex. 2 |
|---|---|---|
| First Stage | | |
| Monomer | styrene | styrene |
| Monomer, pph | 30.00 | 54.00 |
| Initiator, Lupersol | PMS | PMS |
| Initiator, active pph | 0.56 | 1.01 |
| Molar Ratio 1 | 111 | 111 |
| (Monomer:Act. Init.) | | |
| Wt. polypropylene, g | 500 | 450 |
| Wt. monomer, g | 150 | 243 |
| Wt. init. sol., g | 5.62 | 9.09 |
| Total Wt (g) | 655.62 | 702.09 |
| Reaction Temp., C. | 100 | 100 |

TABLE 1A-continued

| Polymerization | Ex. 1 | Ex. 2 |
|---|---|---|
| Final Prod., g | 630 | 678.3 |
| PS Conversion, % | 87 | 94 |
| Add Rate (ml/min) | 4.6 | 4.2 |
| MFR, dg/10 min | 5.8 | 2.5 |
| XSRT*, % | 18 | 27 |
| Second Stage | | |
| Monomer | BA | BA |
| Monomer, pph | 35.08 | 34.95 |
| Init. Lupersol | 11 | 11 |
| Init., active pph | 0.28 | 0.28 |
| Molar Ratio 2 | 170 | 170 |
| (Monomer:Act. Init.) | | |
| Wt. graft copolymer, g | 550 | 575 |
| Wt. monomer, g | 148.4 | 130.5 |
| Wt. init. sol., g | 1.58 | 1.39 |
| Total Wt., g | 699.98 | 706.89 |
| Reaction Temp., C. | 80 | 80 |
| Final Prod., g | 665 | 676 |
| BA Conversion, % | 77 | 77 |
| Add Rate, ml/min. | 5.1 | 5.4 |
| MFR, dg/10 min. | 1.2 | 0.5 |
| XSRT, % | 20 | 27 |

*XSRT = solubles in xylene at room temperature.

TABLE 1B

| Final Properties | Ex. 1 | Ex. 2 |
|---|---|---|
| PP*, wt % | 55 | 64 |
| PS**, wt % | 30 | 19 |
| PBA***, wt % | 15 | 17 |
| Flex Modulus, kpsi | 216 | 177 |
| Notched Izod, ft-lb/in. | 1.8 | 5.5 |
| Tensile Strength, psi | 3954 | 3429 |
| Weldline Str., psi | 2462 | 2488 |
| Retained Str., % | 62 | 73 |
| Elong/n to Break @ W.L., % | 4.0 | 5.9 |

*PP = Polypropylene
**PS = Polystyrene
***PBA = Polybutyl acrylate

EXAMPLE 3

The procedure and ingredients of Example 1 are used except that 142 g of styrene monomer was used in the first graft polymerization stage and in the second graft polymerization stage 142 g of methyl methacrylate monomer was used instead of butyl acrylate and the peroxide and monomer were premixed instead of separate sequential addition. Obtained was (polypropylene-g-polystyrene)-g-polymethyl methacrylate graft copolymer.

The relative operative conditions for the preparation of and physical properties of the particulate graft copolymers of the present invention are shown below in Table 2A and 2B.

EXAMPLE 4

The procedure and ingredients of Example 3 are used except that 142 g of methyl methacrylate monomer was used in the first graft polymerization stage, and 142 g of stryene monomer was used in the second graft polymerization stage. Obtained was (polypropylene-g-polymethyl methacrylate)-g-polystyrene graft copolymer.

The relative operative conditions for the preparation of and physical properties of the particulate graft copolymers of the present invention are shown below in Table 2A and 2B.

EXAMPLE 5

The procedure and ingredients of Example 3 are used except that 125 g of styrene and 120 g of methyl methacrylate monomers, premixed with the peroxide, were copolymerized in the first graft polymerization stage and 41 g of methyl methacrylate, premixed with the peroxide, was used in the second graft polymerization stage instead. Obtained was a (polypropylene-g-polystyrene-co-methyl methacrylate)-g-polymethyl methacrylate graft copolymer.

The relative operative conditions for the preparation of and physical properties of the particulate graft copolymers of the present invention are shown below in Table 2A and 2B.

EXAMPLE 6

The procedure and ingredients of Example 3 are used except that 41 g of methyl methacrylate monomer, premixed with Lupersol 11, was used in the first graft polymerization stage and 125 g styrene and 120 g of methyl methacrylate monomers, premixed with Lupersol 11 peroxide, were copolymerized in the second graft polymerization stage. Obtained was (polypropylene-g-polymethyl methacrylate)-g-poly(styrene-co-methyl methacrylate) graft copolymer.

The relative operative conditions for the preparation of and physical properties of the particulate graft copolymers of the present invention are shown below in Table 2A and 2B.

EXAMPLE 7

The procedure and ingredients of Example 6 are used except that 87 g of styrene and 56 g of methyl methacrylate monomers were copolymerized in the first graft polymerization stage and 58 g of styrene monomer and 84 g of methyl methacrylate (MMA) monomers were copolymerized in the second graft polymerization stage. Obtained was (polypropylene-g-poly(styrene-co-methyl methacrylate))-g-poly(styrene-co-methyl methacrylate) graft copolymer.

The relative operative conditions for the preparation of and physical properties of the particulate graft copolymers of the present invention are shown below in Tables 2A and 2B.

TABLE 2A

| Polymerization | Ex 3 | Ex 4 | Ex 5 | Ex 6 | Ex 7 |
| --- | --- | --- | --- | --- | --- |
| First Stage | | | | | |
| Monomer 1 | styrene | MMA | styrene | MMA | styrene |
| Monomer 1, pph | 34.89 | 34.89 | 30.56 | 10.02 | 21.27 |
| Monomer 2 | | | MMA | | MMA |
| Monomer 2, pph | | | 29.34 | | 13.69 |
| Init. Lupersol | PMS | 11 | 11 | 11 | 11 |
| Init., act. pph | 0.69 | 0.51 | 0.84 | 0.15 | 0.50 |
| Molar Ratio 1 (Mon:Act. Init.) | 105 | 120 | 121 | 119 | 120 |
| Wt. polypropylene, g | 407 | 407 | 409 | 409 | 409 |
| Wt. monomer 1, g | 142 | 142 | 125 | 41 | 87 |
| Wt. monomer 2, g | | | 120 | | 56 |
| Wt. init. sol, g | 5.6 | 2.75 | 4.6 | 0.8 | 2.7 |
| Reaction Temp, C. | 115 | 90 | 90 | 90 | 90 |
| Second stage | | | | | |
| Monomer 1 | MMA | styrene | MMA | styrene | styrene |
| Monomer 1, pph | 34.89 | 34.89 | 10.02 | 30.56 | 14.18 |
| Monomer 2 | | | | MMA | MMA |
| Monomer 2, pph | | | | 29.34 | 20.54 |
| Init. Lupersol | 11 | PMS | 11 | 11 | 11 |
| Init., act. pph | 0.51 | 0.69 | 0.15 | 0.84 | 0.50 |

TABLE 2A-continued

| Polymerization | Ex 3 | Ex 4 | Ex 5 | Ex 6 | Ex 7 |
| --- | --- | --- | --- | --- | --- |
| Molar Ratio 2 (Mon:Act. Init.) | 120 | 105 | 119 | 121 | 120 |
| Wt. monomer 1, g | 142 | 142 | 41 | 125 | 58 |
| Wt. monomer 2, g | | | | 120 | 84 |
| Wt. init. sol, g | 2.75 | 5.6 | 0.8 | 4.6 | 2.7 |
| Total wt., g | 699.4 | 699.4 | 700.4 | 700.4 | 699.4 |
| Reaction Temp, C. | 90 | 115 | 90 | 90 | 90 |
| Final Prod., g | 672 | 663 | 674 | 676 | 676 |
| Conversion, % | 93 | 90 | 93 | 93 | 93 |
| Acutal Add Rate ml/min. | 3.7/5 | 3.9/5 | 4.4/5 | 4.6/5 | 4.0/4 |

TABLE 2B

| Final Properties | Ex 3 | Ex 4 | Ex 5 | Ex 6 | Ex 7 |
| --- | --- | --- | --- | --- | --- |
| Flex Mod., kpsi | 337.3 | 340.2 | 325.5 | 328.6 | 323.6 |
| Notched Izod, ft-lb/in. | 0.18 | 0.15 | 0.33 | 0.32 | 0.28 |
| Tensile Str., psi | 5916 | 5583 | 5087 | 5113 | 5058 |
| Weldline Str., psi | 4445 | 4816 | 4456 | 4648 | 3790 |
| Retained Str., % | 75 | 86 | 88 | 91 | 75 |
| Elong/n to Break @ W.L., % | 5.3 | 5.9 | 5.9 | 6.4 | 4.5 |

Comparative Example 1

The first stage polymerization procedure and ingredients for Example 5 are used for Comparative Example 1, wherein the propylene homopolymer is graft polymerized with comonomers, i.e. styrene and methyl methacrylate, to obtain polypropylene-g-poly(styrene-co-methyl methacrylate).

The physical properties are set forth below in Table 2C.

Comparative Example 2

A polypropylene-g-polystyrene graft copolymer and polypropylene-g-polymethyl methacrylate graft copolymer were mechanically blended, by conventional means, for approximately 1 minute until a homogeneous mixture was obtained, and then molded.

The physical properties of this mechanical blend of two graft copolymers are set forth below in Table 2C.

TABLE 2C

| Properties | Ex 3 | Ex 4 | C-1 | C-2 |
| --- | --- | --- | --- | --- |
| Flex Mod., kpsi | 337.3 | 340.2 | 316.3 | 365.5 |
| Notched Izod, ft-lb/in | 0.18 | 0.15 | 0.27 | 0.18 |
| Tensile Str., psi | 5916 | 5583 | 5031 | 5947 |
| Weldline Str., psi | 4445 | 4816 | 4467 | 3469 |
| Retained Str., % | 75 | 86 | 88 | 58 |
| Elong/n to Break @ W.L., % | 5.3 | 5.9 | 5.9 | 3.4 |

It can be seen that even though sequentially grafted, the graft copolymers of Examples 3 and 4 of the present invention retain the stiffness, impact and weldline strength when compared to Comparative Example 1. When the graft copolymers of the invention are compared to the mechanical blend, as illustrated in Comparative Example 2, it can be seen that the stiffness, impact and tensile properties are similar, however, the graft copolymers of the invention have a significant improvement in weldline strength and strength retention as compared to the mechanical blend of Comparative Example 2.

EXAMPLE 8

Introduced into a reactor was 527.5 g of a graft copolymer of polypropylene grafted with styrene containing 30 pph styrene, prepared according to the method of Example 1. The reactor was purged with nitrogen at room temperature (to an active oxygen content of less than 0.004% by volume) and then heated to 80° C. by circulating hot oil through the reactor jacket, and equilibrated to that temperature while nitrogen purging and stirring continued. Purging is discontinued, the reactor pressure is adjusted, and 1.3 g of an oxygen-free mineral spirit solution of LUPERSOL 11 tert-butylperoxy-pivalate containing 0.24 pph of the peroxy ester is sprayed onto the hot polymer. 121.2 g of butyl acrylate, which had been purged with nitrogen at 5°–10° C., is sprayed into the reactor at a rate of 5.9 ml/min. The total addition time is 30 minutes.

The reactor is purged with nitrogen, and the reactor contents then are heated to 120° C. by purging with heated nitrogen. The reactor temperature is maintained at 120° C. for 30 minutes during which time any unreacted butyl acrylate monomer is swept out of the reactor in the nitrogen flow. After cool-down under a nitrogen blanket, the free-flowing solid (polypropylene-g-polystyrene)-g-polybutylacrylate graft copolymer remaining in the reactor is discharged therefrom, dried and weighed.

The relative operative conditions for the preparation of and physical properties of the particulate graft copolymers of the present invention are shown below in Table 3A and 3B.

EXAMPLES 9 AND 10

The procedure and ingredients of Example 8 are used except that a graft copolymer of polypropylene graft polymerized with styrene having a styrene content of 54 pph was used and the amount of the graft copolymer, the butyl acrylate and peroxy compound used were varied, to obtain (polypropylene-g-polystyrene)-g-polybutyl acrylate graft copolymer.

The relative operative conditions for the preparation of and physical properties of the particulate graft copolymer of the present invention are shown below in Tables 3A and 3B.

EXAMPLE 11

The procedure and ingredients of Example 8 are used except that a graft copolymer of polypropylene graft polymerized with styrene having a styrene content of 85 pph was used and the amount of the graft copolymer, the butyl acrylate and peroxy compound used was varied, to obtain (polypropylene-g-polystyrene)-g-polybutyl acrylate graft copolymer.

The relative operative conditions for the preparation of and physical properties of the particulate graft copolymer of the present invention are shown below in Table 3A and 3B.

TABLE 3A

| Polymerization | Ex 8 | Ex 9 | Ex 10 | Ex 11 |
|---|---|---|---|---|
| Second Stage | | | | |
| Monomer | BA | BA | BA | BA |
| Monomer, pph | 29.9 | 35.42 | 51 | 42.55 |

TABLE 3A-continued

| Polymerization | Ex 8 | Ex 9 | Ex 10 | Ex 11 |
|---|---|---|---|---|
| Init. Lupersol | 11 | 11 | 11 | 11 |
| Init., act. pph | 0.24 | 0.28 | 0.41 | 0.34 |
| Molar Ratio (Mon:Act. Init.) | 170 | 170 | 170 | 170 |
| Wt. graft copolymer, g | 527.5 | 527.0 | 487.4 | 527.5 |
| Wt. monomer, g | 121.2 | 121.8 | 162.0 | 121.6 |
| Wt init. sol., g | 1.3 | 1.4 | 1.7 | 1.3 |
| Total Wt, g | 650.0 | 650.2 | 651.1 | 650.4 |
| Reaction Temp., C. | 80 | 80 | 80 | 80 |
| Final Prod., g | 617 | 612 | 582 | 578 |
| Conversion, % | 73 | 69 | 58 | 41 |

Comparative Example 3

A graft copolymer of polypropylene graft polymerized with styrene containing a graft polymerized styrene content of 85 pph was prepared according to the premixed addition of peroxide and monomer set forth above in the first graft polymerization method of Example 1.

A graft copolymer of polypropylene graft polymerized with butyl acrylate monomer containing a graft polymerized butyl acrylate content of 50 pph was prepared according to the separate sequential addition of peroxide and monomer set forth above in the second graft polymerization method of Example 1.

The graft copolymer of polypropylene graft polymerized with styrene monomer, prepared as decribed above, and the graft copolymer of polypropylene graft polymerized with butyl acrylate prepared above were mechanically blended, by conventional means, until a homogeneous mixture was obtained and then molded.

The physical properties are set forth below in Table 3B.

TABLE 3B

| Final Properties | Ex 8 | C-3 |
|---|---|---|
| Wt PS, % | 20 | 26 |
| Wt PBA, % | 15 | 15 |
| Flex Mod., kpsi | 222.8 | 240.7 |
| Notched Izod, ft-lb/in | 3.7 | 3.0 |
| Tensile Str., psi | 4266 | 4422 |
| Weldline Str., psi | 2794 | 1285 |
| Retained Str., % | 65 | 29 |
| Elong/n to Break @ W.L., % | 4.5 | 1.6 |

The sequentially grafted copolymer of Example 8 of the present invention and the mechanical blend of Comparative Example 3 have similar stiffness and impact properties. However, it can be seen that the graft copolymer of the invention has a much higher weldline strength and strength retention than the mechanical blend of Comparative Example 3.

EXAMPLE 12

The procedure of Example 3 is used, except that 16 lbs of styrene monomer and 5.4 lbs of acrylonitrile (AN) monomer, premixed with peroxide, were copolymerized in the first graft polymerization stage and 121.6 g of butyl acrylate monomer, premixed with peroxide, was used in the second graft polymerization stage to obtain a (polypropylene-g-polystyrene-co-acrylonitrile)-g-polybutyl acrylate graft copolymer.

The relative operative conditions for the preparation of and the physical properties of the the particulate graft copolymers of the present invention are shown below in Tables 4A and 4B.

EXAMPLE 13

The procedure of Example 12 is used, except that 1.3 lbs of styrene monomer, 0.42 lbs of methyl methacrylate (MMA) monomer and 0.95 lbs of acrylonitrile monomer, premixed with peroxide, were copolymerized in the first graft polymerization stage and 181 g of butyl acrylate monomer, premixed with peroxide, was used in the second graft polymerization stage to obtain a (polypropylene-g-polystyrene-co-methyl methacrylate-co-acrylonitrile)-g-polybutyl acrylate graft copolymer.

The relative operative conditions for the preparation of and the physical properties of the the particulate graft copolymers of the present invention are shown below in Tables 4A and 4B.

EXAMPLE 14

The procedure of Example 3 is used, except that 152 g of styrene monomer and 61 g of maleic anhydride (MA) monomer, premixed with peroxide, were copolymerized in the first graft polymerization stage and 124.6 g of butyl acrylate (BA) monomer, premixed with peroxide, was used in the second graft polymerization stage to obtain a (polypropylene-g-polystyrene-co-maleic anhydride)-g-polybutyl acrylate graft copolymer.

The relative operative conditions for the preparation of and the physical properties of the the particulate graft copolymers of the present invention are shown below in Tables 4A and 4B.

TABLE 4A

| Polymerization | Ex 12 | Ex 13 | Ex 14 |
|---|---|---|---|
| First Stage | | | |
| Monomer 1 | styrene | styrene | styrene |
| Monomer 1, pph | 40.5 | 25 | 42.71 |
| Monomer 2 | AN | MMA | MA |
| Monomer 2, pph | 13.5 | 7.5 | 17.14 |
| Monomer 3 | | AN | |
| Monomer 3, pph | | 17.5 | |
| Init. Lupersol | 11 | 11 | 11 |
| Init., act. pph | 1.0 | 0.93 | 0.67 |
| Molar Ratio 1 | 110 | 122 | 151 |
| (Mon:Act. Init.) | | | |
| Wt. polypropylene | 40 lbs | 5.3 lbs | 355.9 g |
| Wt. monomer 1 | 16 lbs | 1.3 lbs | 152 g |
| Wt. monomer 2 | 5.4 lbs | 0.42 lbs | 61 g |
| Wt. monomer 3 | | 0.95 lbs | |
| Wt. init. sol. | 0.542 lbs | 30.1 g | 3.2 g |
| Reaction Temp., C. | 80 | 80 | 90 |
| Second Stage | | | |
| Monomer | BA | BA | BA |
| Monomer, pph | 35.42 | 35 | 35 |
| Init. Lupersol | 11 | 11 | 11 |
| Init., act. pph | 0.18 | 0.28 | 0.28 |
| Molar Ratio 2 | 170 | 172 | 170 |
| (Mon:Act. Init.) | | | |
| Wt. monomer, g | 121.6 | 181 | 124.6 |
| Wt. graft copolymer, g | 527 | 517 | |
| Wt. init. sol., g | 1.3 | 1.9 | 1.3 |
| Total wt., g | 649.9 | 699.9 | 698.0 |
| Reaction Temp., C. | 80 | 80 | 80 |
| Final Prod., g | 578 | 644 | 659 |
| Conversion, % | 41 | 70 | 89 |

Comparative Example 4

The first stage polymerization procedure and ingredients for Example 13 are used for Comparative Example 4, wherein the propylene homopolymer is graft polymerized with styrene and methyl methacrylate and acrylonitrile monomers, to obtain polypropylene-g-poly(styrene-co-methyl methacrylate-co-acrylonitrile) graft copolymer.

A graft copolymer of polypropylene graft polymerized with butyl acrylate was prepared according to the second polymerization stage of Example 13 to obtain a polypropylene-g-butyl acrylate.

The graft terpolymer and the graft copolymer prepared above were mechanically blended and molded.

The physical properties are set forth below in Table 4B.

Comparative Example 5

A graft copolymer of polypropylene-g-poly(styrene-co-acrylonitrile was prepared according to the premixed addition of peroxide and monomer set forth above in the first graft polymerization method of Example 12.

A graft copolymer of polypropylene-g-polybutyl acrylate was prepared according to the separate sequential addition of peroxide and monomer set forth above in the second graft polymerization method of Example 12.

The graft copolymer of polypropylene-g-poly(styrene-co-acrylonitrile, prepared as decribed above, and the graft copolymer of polypropylene-g-polybutyl acrylate prepared above were mechanically blended and molded.

The physical properties are set forth below in Table 4B.

TABLE 4B

| Final Properties | Ex 12 | Ex 13 | Ex 14 | C-4 | C-5 |
|---|---|---|---|---|---|
| Flex Modulus, kpsi | 221 | 169 | 218 | 221 | 221 |
| Notched Izod, ft-lb/in | 1.1 | 2.3 | 0.7 | 0.9 | 1.2 |
| Tensile Str., psi | 4558 | 3643 | 3561 | 3411 | 3532 |
| Weldline Str., psi | 2642 | 1910 | 2212 | 1439 | 1384 |
| Retained Str., % | 58 | 52 | 62 | 42 | 39 |
| Elong/n to Break @ W.L., % | 4.4 | 4.2 | 3.5 | 1.9 | 2.0 |

It can be seen that the sequential grafts of Example 12 and Example 13 of the invention again demonstrate similar stiffness and impact properties to those of Comparative Examples 4 and 5, but much better weldline strength and strength retention.

To further differentiate the graft copolymers of the present invention from the graft copolymers prepared by conventional grafting methods and mechanical blending of two graft copolymers, additional characterization of the materials, transmission electron microscopy (TEM), and dynamic mechanical thermal analysis (DMTA), as well as the physical properties of the materials were carried out. The results are set forth below.

Figure 1:
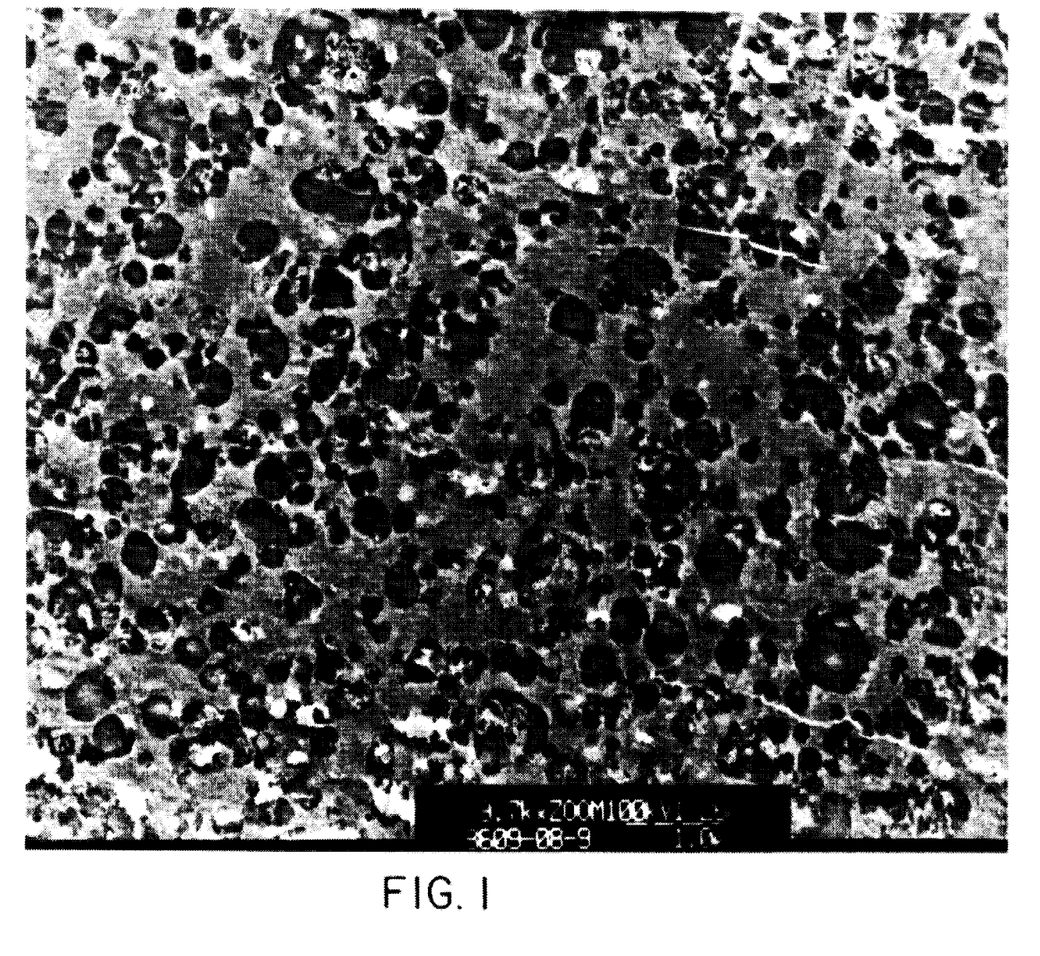
FIG. 1 is a transmission electron microscopy photograph of a mechanical blend of a polypropylene grafted with butyl acrylate and a polypropylene grafted with styrene at a magnification of 9.7 k.
Figure 2:
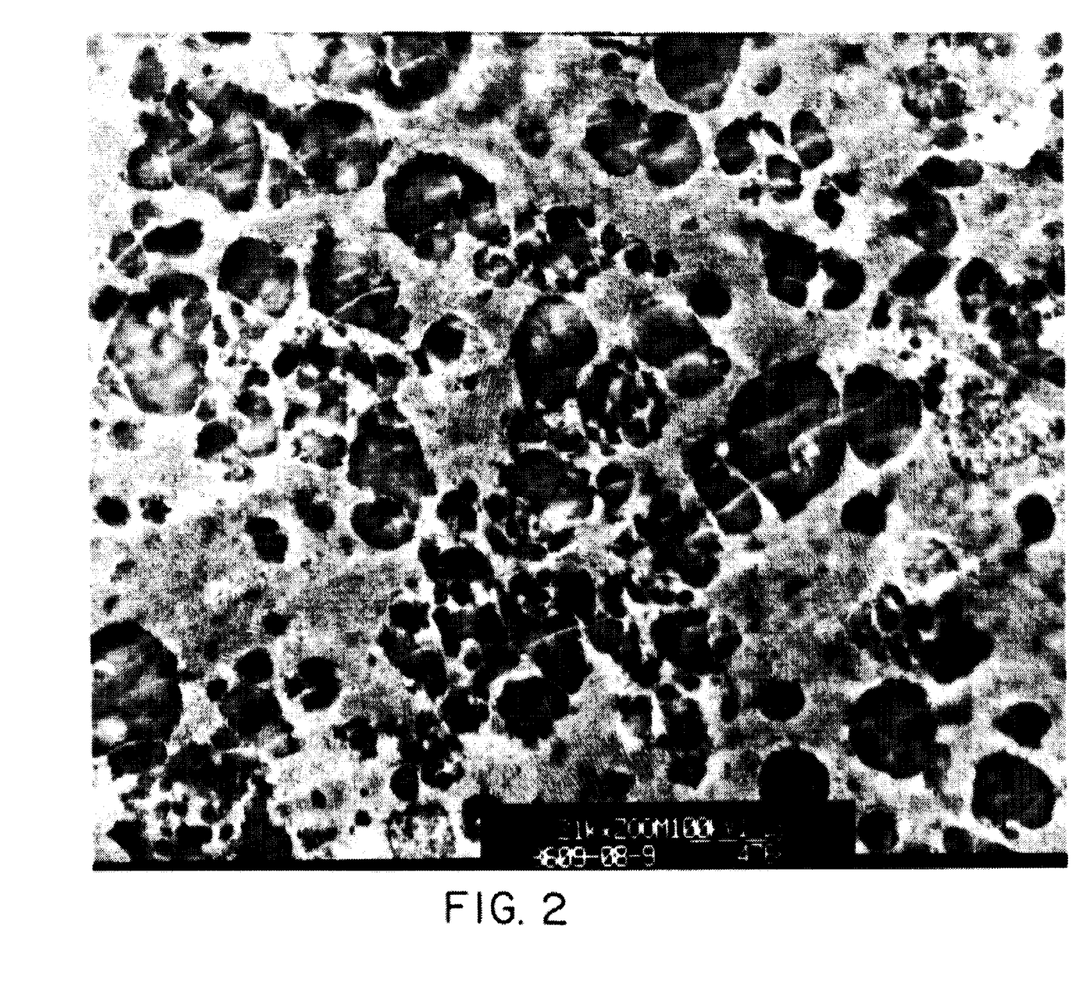
FIG. 2 is a transmission electron microscopy photograph of the same mechanical blend as in FIG. 1, except at a magnification 21 k.
Figure 3:
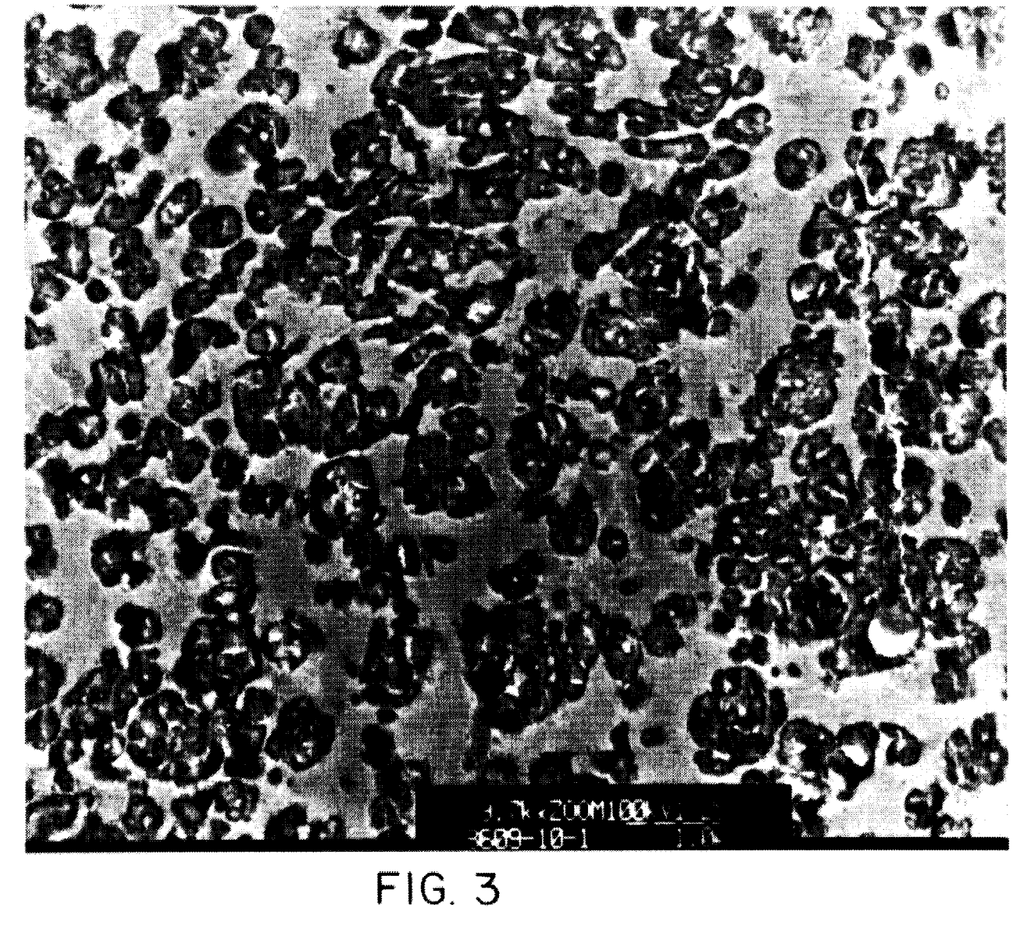
FIG. 3 is a transmission electron microscopy photograph of a sequentially grafted copolymer of (polypropylene-g-polystyrene)-g-polybutyl acrylate of the invention at a magnification 9.7 k.
Figure 4:
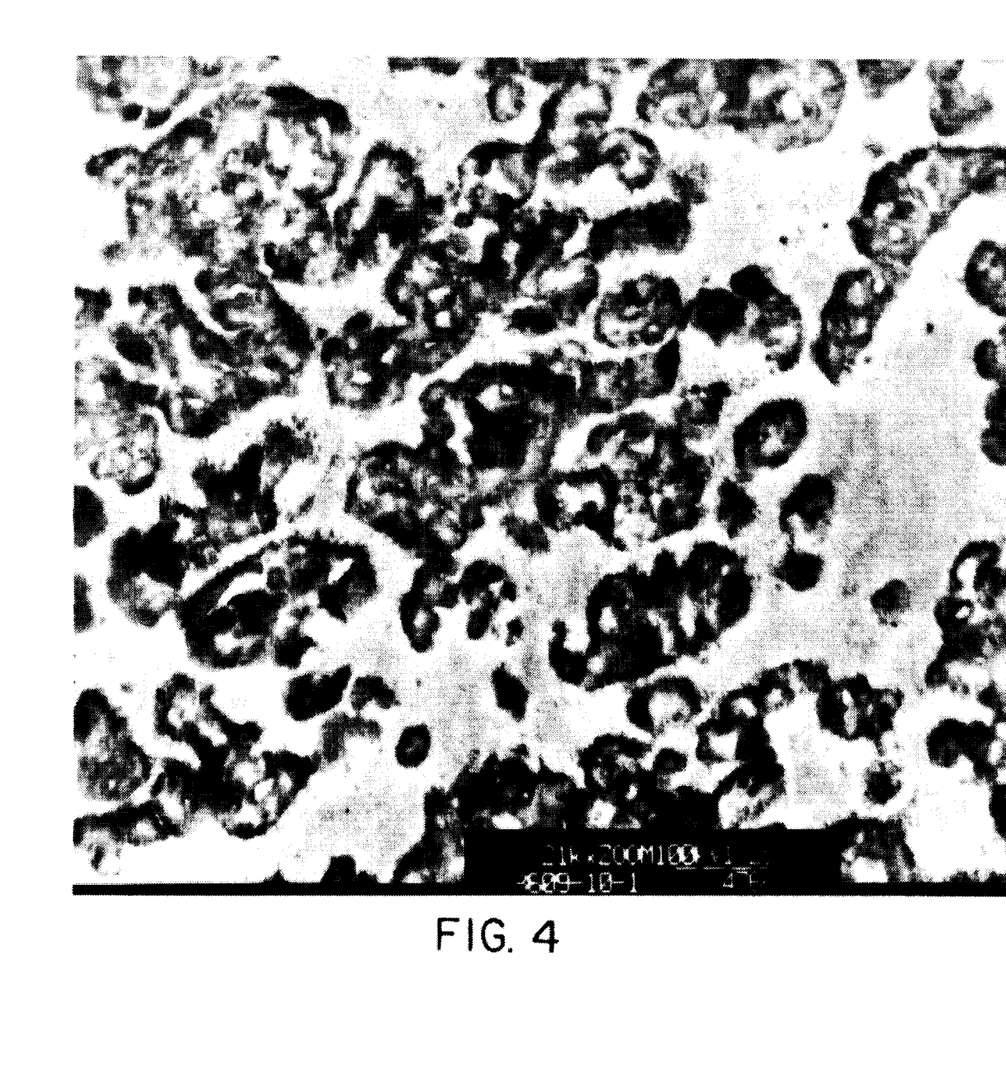
FIG. 4 is a transmission electron microscopy photograph of the same sequentially grafted copolymer as in FIG. 3, except at a magnification of 21 k.
Figure 5:
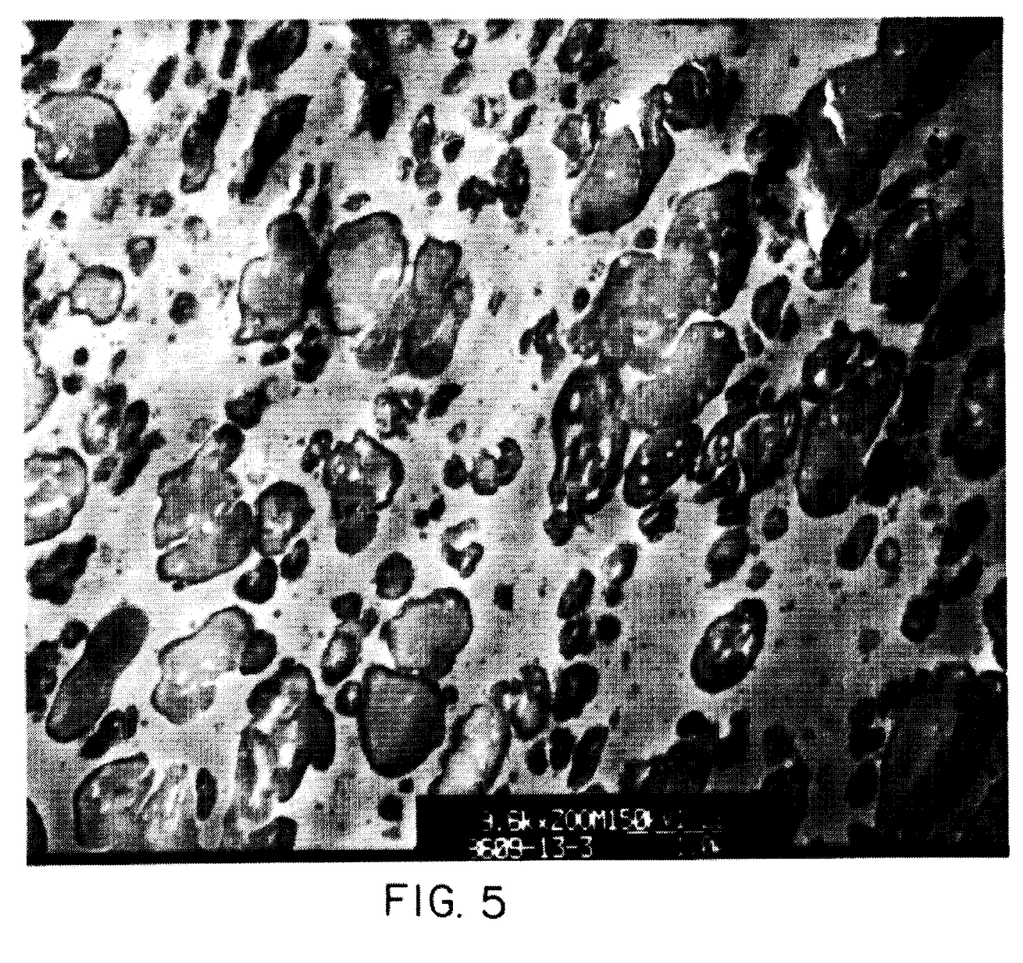
FIG. 5 is a transmission electron microscopy photograph of a non-sequentially graft copolymer of polypropylene-g-poly(styrene-co-butyl acrylate) at a magnification 9.6 k.
Figure 6:
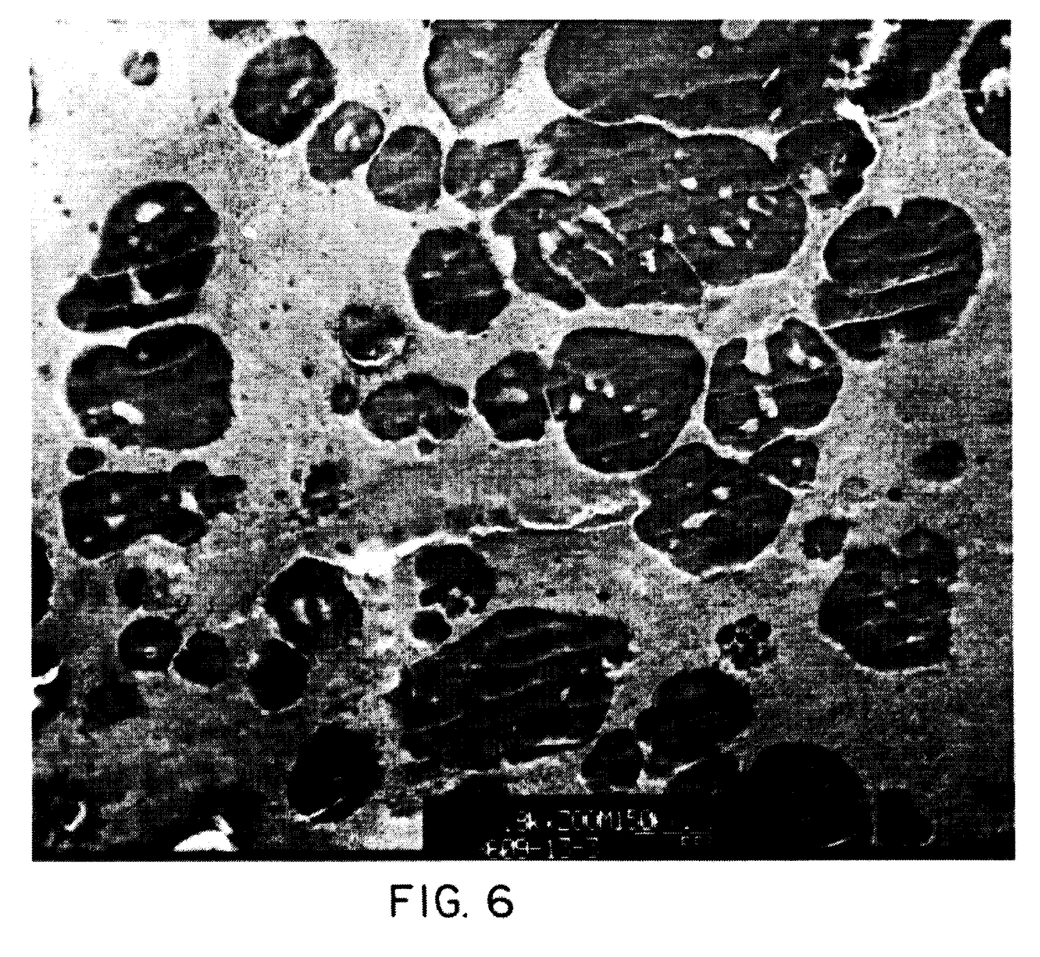
FIG. 6 is a transmission electron microscopy photograph of the same graft copolymer as in FIG. 5, except at a magnification of 18 k.

Transmission electron microscopy (TEM) photographs, FIGS. 1–6, were taken to study the morphology of a mechanical blend of two graft copolymers, illustrated in FIGS. 1 and 2, a graft copolymer of the present invention, illustrated in FIGS. 3 and 4, and a graft copolymer prepared by a conventional grafting method, illustrated in FIGS. 5 and 6.

The mechanical blend of FIGS. 1 and 2 consist of a polypropylene-g-polystryene blended with a polypropylene-g-polybutyl acrylate. In the photographs three phases can be seen, the polypropylene matrix identified by the gray fingerprint-like patterns, the polystyrene by the black stained domains and the polybutyl acrylate by the light grey stained domains. While it is quite clear from the photographs that three phases exist in the mechanical blend, clear and distinct separation of the polypropylene, the polystyrene and the polybutyl acrylate domains is evidenced.

The graft copolymer of FIGS. 3 and 4 is a (polypropylene-g-polystyrene)-g-polybutyl acrylate of the present invention. Like the mechanical blend three phases can be seen, the polypropylene matrix identified by the gray fingerprint-like patterns, the polystyrene by the black stained domains and the polybutyl acrylate by the light grey stained domains. However, while separate, the polystyrene and polybutyl acrylate domains are clearly intermingled throughout the polypropylene matrix. In other words, the domains of the polystyrene and polybutyl acrylate are linked together forming a network of the two domains. This morphology is clearly distiguishable from the morphology of the mechanical blends which show the three polymers as being totally separate one from the other without any network or linking of any of the domains.

The graft copolymer of FIGS. 5 and 6 is a polypropylene-g-poly(styrene-co-butyl acrylate) graft copolymer, prepared by the grafting method of U.S. Pat. No. 5,140,074, wherein the polypropylene is grafted with a copolymer of styrene and butyl acrylate, the monomers are copolymerized during the grafting process. Unlike the mechanical blend and the graft copolymer of the present invention, two distinct phases are seen, polypropylene matrix and poly(styrene-co-butyl acrylate) identified by the gray fingerprint-like patterns and the dark grey/black domain, respectively. There are no separate polystyrene and polybutyl acrylate domains as seen in the photographs of the mechanical blend and graft copolymer of the invention. Only two types of polymers and domains are seen, the polypropylene and poly(styrene-co-butyl acrylate).

The dynamic mechanical thermal analysis, (DMTA), is a common laboratory technique for polymer characterization. The following analyses were preformed on a Polymer Laboratory's Dynamic Mechanical Thermal Analyser using a 3 mm×12.5 mm×32 mm center portion of an injection molded T-bar. The analyser measures the stiffness and mechanical loss of a polymer sample by flexing the sample at a frequency of 1 Hz while the temperature is ramped from −100° C. to 170° C. at a rate of 3° C./min.

The dynamic mechanical thermal analysis, (DMTA), of the mechanical blend of FIGS. 1 and 2, the graft copolymer of the present invention of FIGS. 3 and 4 and the graft copolymer of FIGS. 5 and 6 was evaluated to determine the modulus and mechanical loss of the respective materials.

Three peaks were seen in the graph of mechanical loss versus temperature in the DMTA of the mechanical blend of polypropylene-g-polystyrene and polypropylene-g-polybutyl acrylate, FIGS. 1 and 2. A peak is present at the glass transition temperature for each of the three separate polymer phases in the blend, polybutyl acrylate peak at −33° C., polypropylene peak at 14.5° C. and polystyrene peak at 110° C., which substantiates that the morphology is three phases as shown by the TEM photographs.

The DMTA of the graft copolymer of the present invention, FIGS. 3 and 4, also showed three peaks, one at the glass transition temperature for each of the three separate polymer phases, polybutyl acrylate peak at −31.5° C., polypropylene peak at 16.5° C. and polystyrene peak at 107.5° C.

Only two peaks were present in the graph of mechanical loss versus temperature in the DMTA of the graft copolymer of FIGS. 5 and 6, one at 14.5° C. for polypropylene and the other at 65.5° C. for the poly(styrene-co-butyl acrylate). The DMTA clearly evidences the two phase nature of this graft copolymer. The combination of the styrene and butyl acrylate chemistries along the same polymer chain is evident in that the glass transition temperature of 65.5° C. is between the glass transition temperature of the polymer composed of the pure components: pure polybutyl acrylate −35° C. and pure polystyrene 110° C.

A DMTA was measured for a sequentially grafted (polypropylene-g-poly(styrene-co-acrylonitrile-co-methyl methacrylate))-g-polybutyl acrylate of the present invention. As demonstrated in the graft copolymer of the present invention, three phases are seen. The three phase nature of this material is demonstrated by the appearance of three peaks in the graph of mechanical loss versus temperature. A peak is present at −30.5° C. for polybutyl acrylate, at 17.5° C. for polypropylene and at 110° C. for poly(styrene-co-acrylonitrile-co-methyl methacrylate).

In Table 5 set forth below, the physical properties of the materials of the mechanical blend, FIG. 1, the graft copolymer of the present invention, FIG. 3, and the graft copolymer, FIG. 5. It can be seen that the graft copolymer of the present invention, FIG. 3, has improved weldline strength and flexural modulus as compared to the graft copolymer of the mechanical blend, FIG. 1, and improved impact as compared to the graft copolymer of FIG. 5.

TABLE 5

| Properties | FIG. 1 | FIG. 3 | FIG. 5 |
| --- | --- | --- | --- |
| Wt % PS* | 20.3 | 28.6 | |
| Wt % PBA** | 15 | 14.8 | |
| Flex Modulus, kpsi | 197.9 | 215.5 | 305 |
| Notched Izod, ft-lb/in | 2.3 | 1.8 | 0.27 |
| Tensile Strength, psi | 3886 | 3954 | 5144 |
| Weldline Strength, psi | 1633 | 2462 | 3064 |
| Elong/n to Break @ W.L., % | 2.4 | 4.0 | 3.4 |

*PS = Polystyrene
**PBA = Polybutyl acrylate

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A method for preparing a graft copolymer of an olefin polymer material comprising a graft copolymerization process having at least two stages, wherein (A) the first stage comprises:

(i) treating a particulate olefin polymer material at a temperature of from 60° C. to 125° C. with from 0.1 to 6.0 pph of an organic compound which is a free radical polymerization initiator and has a decomposition half-life at the temperature used of about from 1 to 240 minutes;

(ii) treating said olefin polymer material at said temperature over a time period which coincides with or follows (i), with or without overlap, with about from 5 to 145 pph of at least one vinyl monomer capable of being polymerized by free radicals, said monomer being added to said olefin polymer material over a time period from 5 minutes to 3–4 hours to provide a rate of addition which is less than about 4.5 pph per minute at any addition level;

(iii) removing any unreacted grafting monomer from the resultant grafted particulate olefin polymer material, and decomposing any unreacted initiator and deactivating any residual free radicals in said material;

and (B) the second graft polymerization stage comprises:

(i) treating the grafted olefin polymer material resulting from the first graft polymerization stage (A) at a temperature of from 60° C. to 125° C. with from 0.1 to 6.0 pph of an organic compound which is a free radical polymerization initiator and has a decomposition half-life at the temperature used of about from 1 to 240 minutes;

(ii) treating said grafted olefin polymer material at said temperature over a time period which coincides with or follows (i), with or without overlap, with about from 5 to 145 pph of at least one vinyl monomer capable of being polymerized by free radicals, said monomer being added to said olefin polymer material over a time period from 5 minutes to 3–4 hours to provide a rate of addition which is less than about 4.5 pph per minute at any addition level; and (iii) removing any unreacted grafting monomer from the resultant grafted particulate olefin polymer material, and decomposing any unreacted initiator and deactivating any residual free radicals in said material.

2. The method of claim 1, wherein said olefin polymer material is selected from the group consisting of (a) a homopolymer of a linear of branched $C_{2-8}$ alpha-olefin, (b) a random copolymer of a linear of branched $C_{2-8}$ alpha-olefin with a different olefin selected from the group consisting of ethylene and $C_4$–$C_{10}$ 1-olefins, (c) a random terpolymer of linear or branched $C_{3-8}$ alpha-olefin and two different olefins selected from the group consisting of ethylene and $C_4$–$C_8$ 1-olefins, and (d) a homopolymer of (a) or random copolymer (b) of propylene which is impact modified with an ethylenepropylene monomer rubber.

3. The graft copolymer of an olefin polymer material prepared according to the method of claim 2.

4. The graft copolymer of claim 3, wherein said vinyl monomer of (B) (ii) is butyl acrylate.

5. The graft copolymer of claim 3, wherein said vinyl monomer of (B) (ii) is methyl methacrylate.

6. The method of claim 1, wherein said vinyl monomer is selected from the group consisting of vinyl substituted aromatic, heterocyclic, and alicyclic compounds, unsaturated aliphatic carboxylic acids and derivatives thereof, unsaturated aliphatic nitriles, vinyl esters of aromatic and saturated aliphatic carboxylic acids and mixtures thereof.

7. The graft copolymer of an olefin polymer material prepared according to the method of claim 6.

8. The method of claim 1, wherein said organic compound is a peroxy compound.

9. The method of claim 8, wherein in the first graft polymerization stage the grafting monomer is added to said olefin polymer material over a period of time which follows the time period over which the peroxy compound is added thereto.

10. The method of claim 9, wherein in the second graft polymerization stage the grafting monomer is added to said grafted olefin polymer material over a period of time which coincides with the period with the period over which said peroxy compound is added thereto.

11. The method of claim 8, wherein in the first graft polymerization stage the grafting monomer is added to said olefin polymer material over a period of time which coincides with period with the period over which said peroxy compound is added thereto.

12. The method of claim 11, wherein in the second graft polymerization stage the grafting monomer is added to said grafted olefin polymer material over a period of time which follows the period over which said peroxy compound is added thereto.

13. The graft copolymer of an olefin polymer material prepared according to the method of claim 1.

14. The graft copolymer of claim 13, wherein said olefin polymer material graft polymerized is a propylene homopolymer and the vinyl monomer of (A) (ii) is styrene.

* * * * *